US010486407B2

(12) United States Patent
De Wilde et al.

(10) Patent No.: US 10,486,407 B2
(45) Date of Patent: Nov. 26, 2019

(54) METHOD FOR MANUFACTURING A FLEXIBLE SKIN HAVING AT LEAST ONE INSERT ADHERED THERETO

(71) Applicant: RECTICEL AUTOMOBILSYSTEME GMBH, Rheinbreitbach (DE)

(72) Inventors: Peter De Wilde, Brussels (BE); Jean-Christophe Bouckaert, Brussels (BE); Filip De Swaef, Brussels (BE); Frank Dierens, Brussels (BE)

(73) Assignee: RECTICEL AUTOMOBILSYSTEME GMBH, Rheinbreitbach (DE)

( * ) Notice: Subject to any disclaimer, the term of this patent is extended or adjusted under 35 U.S.C. 154(b) by 1171 days.

(21) Appl. No.: 14/410,785

(22) PCT Filed: Jun. 27, 2013

(86) PCT No.: PCT/EP2013/063534
§ 371 (c)(1),
(2) Date: Dec. 23, 2014

(87) PCT Pub. No.: WO2014/001462
PCT Pub. Date: Jan. 3, 2014

(65) Prior Publication Data
US 2015/0165750 A1    Jun. 18, 2015

(30) Foreign Application Priority Data

Jun. 28, 2012  (EP) .................................... 12174237

(51) Int. Cl.
*B32B 37/24*  (2006.01)
*B32B 7/12*  (2006.01)
(Continued)

(52) U.S. Cl.
CPC ........ *B32B 37/24* (2013.01); *B29C 45/14467* (2013.01); *B29C 45/1671* (2013.01);
(Continued)

(58) Field of Classification Search
CPC .. B32B 37/24; B32B 1/00; B32B 7/12; B32B 37/1284; B32B 37/142; B32B 3/08;
(Continued)

(56) References Cited

U.S. PATENT DOCUMENTS 4,810,452 A    3/1989  Taillefert et al.
5,403,645 A    4/1995  Stein et al.
(Continued)

FOREIGN PATENT DOCUMENTS

DE    10350050 A1 *  5/2005  ......... B29C 44/1271
DE    10350050 A1     5/2005
(Continued)

OTHER PUBLICATIONS

English translation—DE10350050-A1; May 2005; Stehning, Kai.*
International Search Report Form PCT/ISA/210 for PCT/EP2013/063534 dated Oct. 2, 2013.

*Primary Examiner* — Philip C Tucker
*Assistant Examiner* — Vicki Wu
(74) *Attorney, Agent, or Firm* — Ferguson Case Orr Paterson (57) ABSTRACT

The present invention relates to a method for manufacturing a flexible skin which has at least one insert adhered thereto. In a first step, the skin is molded on a mold surface. In order to adhere the insert to the skin, an opening is first made in the skin giving access to the back face of the insert. The insert is positioned with its back face against the front face of the skin and an adhering layer is provided which is adhesively connected to the back face of the skin layer which surrounds the opening in the skin layer and, through this opening, to the back face of the insert. The adhering layer is preferably produced by applying a layer of a hardenable material, in particular a curable polyurethane composition. Since the back face of the insert engages the (Continued)

front side of the skin penetration of hardenable material to the front face of the insert is avoided.

11 Claims, 4 Drawing Sheets

(51) Int. Cl.
| | |
|---|---|
| B29C 65/50 | (2006.01) |
| B32B 37/14 | (2006.01) |
| B29C 65/70 | (2006.01) |
| B29C 65/48 | (2006.01) |
| B32B 1/00 | (2006.01) |
| B32B 37/12 | (2006.01) |
| B29C 45/14 | (2006.01) |
| B29C 45/16 | (2006.01) |
| B29C 67/24 | (2006.01) |
| B32B 3/08 | (2006.01) |
| B29L 31/30 | (2006.01) |
| B29L 31/00 | (2006.01) |
| B29C 65/78 | (2006.01) |
| B29C 65/00 | (2006.01) |
| B29K 75/00 | (2006.01) |
| B29C 65/52 | (2006.01) |
| B29L 9/00 | (2006.01) |

(52) U.S. Cl.
CPC .............. *B29C 65/48* (2013.01); *B29C 65/50* (2013.01); *B29C 65/70* (2013.01); *B29C 67/246* (2013.01); *B32B 1/00* (2013.01); *B32B 3/08* (2013.01); *B32B 7/12* (2013.01); *B32B 37/1284* (2013.01); *B32B 37/142* (2013.01); B29C 45/14778 (2013.01); B29C 65/483 (2013.01); B29C 65/4815 (2013.01); B29C 65/505 (2013.01); B29C 65/522 (2013.01); B29C 65/527 (2013.01); B29C 65/7805 (2013.01); B29C 65/7841 (2013.01); B29C 66/137 (2013.01); B29C 66/5326 (2013.01); B29C 66/71 (2013.01); B29C 66/723 (2013.01); B29C 66/729 (2013.01); B29C 66/7394 (2013.01); B29C 66/7484 (2013.01); B29C 66/7487 (2013.01); B29K 2075/00 (2013.01); *B29L 2009/00* (2013.01); *B29L 2031/3005* (2013.01); *B29L 2031/3008* (2013.01); *B29L 2031/3014* (2013.01); *B29L 2031/737* (2013.01); *Y10T 428/24628* (2015.01)

(58) Field of Classification Search
CPC ..... Y10T 428/24628; B29L 2031/3008; B29L 2031/737; B29L 2031/3005; B29L 2031/3014; B29L 2009/00; B29C 45/14467; B29C 45/14778; B29C 65/48; B29C 65/4815; B29C 65/483; B29C 65/505; B29C 65/70; B29C 65/7841; B29C 66/137; B29C 66/5326; B29C 66/71; B29C 66/723; B29C 66/729; B29C 66/7394; B29C 66/7484; B29C 66/7487; B29C 67/246; B29C 65/522; B29C 65/527; B29C 65/7805; B29C 65/50; B29K 2075/00
USPC ..................................................... 156/245
See application file for complete search history.

(56) References Cited

U.S. PATENT DOCUMENTS

| | | | |
|---|---|---|---|
| 2003/0180498 A1* | 9/2003 | De Winter | .............. B29C 33/12 428/67 |
| 2011/0115127 A1* | 5/2011 | Breest | ................... B29C 33/306 264/279 |

FOREIGN PATENT DOCUMENTS

| | | | |
|---|---|---|---|
| EP | 0303305 | 6/1988 | |
| EP | 0379246 | 1/1990 | |
| EP | 0929586 A1 | 10/1997 | |
| EP | 0642411 A1 | 12/1997 | |
| JP | 2002046133 | 2/2002 | |
| JP | 2002046133 A * | 2/2002 | ......... B29C 44/1257 |
| JP | 2004504196 | 2/2004 | |
| WO | WO 9814492 A1 | 4/1998 | |
| WO | WO 02/09977 A1 | 2/2002 | |
| WO | WO2004000905 A1 | 12/2003 | |
| WO | WO2007023157 A1 | 3/2007 | |
| WO | WO2007137623 A1 | 12/2007 | |
| WO | WO 2010003915 | 7/2009 | |

* cited by examiner

METHOD FOR MANUFACTURING A FLEXIBLE SKIN HAVING AT LEAST ONE INSERT ADHERED THERETO

The present invention relates to a method for manufacturing a flexible skin which has at least one insert adhered thereto, said flexible skin and said insert defining together a visible front surface;

said flexible skin consisting of one or more skin layers and having a front face, forming a first portion of the visible front surface of the skin, and a back face; and said insert having a back face, which is fixed by means of an adhering layer to this flexible skin, and a front face, which forms a second portion of said visible front surface, which second portion is situated adjacent said first portion of the visible front surface.

The flexible skin with the insert(s) adhered thereto is manufactured by a method comprising the successive steps of:

providing a mould surface;

moulding at least one of said skin layers against said mould surface, which mould surface has a raised portion so that a recessed portion is produced in the front face of the flexible skin layer which is moulded against the mould surface;

removing the moulded skin layer from the mould surface;

positioning said insert in said recessed portion with a portion of its back face against the moulded skin layer; and adhering the back face of the insert by means of an adhering layer to the moulded skin layer.

Such a method is disclosed in WO 2010/003915. In this method the skin layer is moulded by spraying a curable polyurethane composition onto a mould surface. A silicone mould surface element is positioned between upstanding edges on the mould surface to define a raised mould surface portion. The curable polyurethane composition is sprayed in a continuous layer over the mould surface, including the portion of the mould surface defined by the silicone mould surface element. A completely closed recessed portion is thus obtained in the front face of the skin layer. The insert is fixed in this recessed portion of the skin layer by means of a foaming reaction mixture producing an adhering foam layer between the back face of the insert and the front face of the skin layer.

An advantage of this prior art method is that the insert doesn't have to be positioned in the heated mould used to mould the skin layer and that a gap free connection can be achieved between the skin and the visible surface of the insert. In other prior art methods, for example in the method disclosed in WO 02/09977, the insert is indeed positioned between upstanding edges on the mould surface of a heated mould before the curable polyurethane composition is sprayed on this mould surface, and on the back faces of the insert, to produce the flexible skin having the insert adhered to the front face thereof. A drawback of this method is that the sealing of the inserts against the upstanding edges on the mould surface is often not perfect due to the dimensional tolerances of the insert, for example as a result of the temperature increase of the insert on the heated mould surface, so that the curable polyurethane composition, which has a relatively low viscosity in order to be sprayable, can penetrate between the upstanding edges and the lateral sides of the inserts. This is especially the case when the inserts are not positioned on a horizontal portion of the mould surface. Another drawback of this method is that there is always a gap between the insert and the surrounding portion of the skin layer. Such a gap can be avoided by omitting the upstanding edges on the mould surface. Such a method is for example disclosed in U.S. Pat. No. 4,810,452, but in that method penetration of curable polyurethane composition onto the visible front face of the inserts is even harder to avoid due to the absence of the upstanding edges which engage the lateral sides of the inserts.

DE 103 50 050 discloses a method for integrating an insert in a flexible skin wherein a gap free transition between the insert and the surrounding flexible skin can be obtained. The flexible skin is made in this method by a thermoforming process wherein a thermoplastic foil is deep-drawn against a heated mould surface. The inserts are provided on their back faces with pins which project through holes in the flexible skin to be adhered to the backfoam layer. Since the mould surface has no upstanding edges to keep the inserts in place, it is difficult to position them correctly in the mould and to avoid displacing them during the thermoforming process. The inserts can also be fixed first by means of their pins in the holes in the thermoplastic foil before positioning this foil in the mould. The thermoplastic foil is then moulded/thermoformed against the back of the insert to form a recessed portion containing the insert. The required pressure is exerted onto the thermoplastic foil by the foamable composition injected against the back of the thermoplastic foil or by vacuum-drawing. A drawback of this method is that the insert should also be heated to be able to thermoform the thermoplastic foil accurately along the lateral sides of the insert or in other words to achieve a qualitative transition between the front surface of the skin and the front side of the insert. A lot of inserts can however not be heated to such a temperature.

As explained already hereabove, a gap free connection between the front face of the skin layer and the visible side of the inserts can also be achieved by the method disclosed in WO 2010/003915 wherein the inserts are adhered by an adhesive foam layer in a recessed portion in the front face of the skin layer. Since this adhesive foam layer is produced by a foaming reaction, and since a closed cavity is formed between the back face of the insert and the front face of the skin, which closed cavity has to be filled completely with the adhesive foam, there is a great risk that the produced foam penetrates between the lateral sides of the inserts and the flexible skin as a result of the pressure created by the foaming reaction. Moreover, when applying the adhesive foam either in the recessed portion of the skin or on the back face of the insert, there still is a risk of soiling the visible front face of the flexible skin.

An object of the present invention is to provide a new method for manufacturing a flexible skin which has at least one insert adhered thereto which enables to achieve a gap free connection between the visible side of the insert and the front face of the skin and which avoids penetration of curable composition towards the front face of the insert.

To achieve this object, the method of the present invention is characterised in that the skin layer is provided with at least one opening giving access to the back face of the insert; and after having positioned the insert with a portion of its back face against the front face of said skin layer, the back face of the insert is adhered to the skin layer by providing an adhering layer adhesively connected to at least a portion of the back face of the skin layer which surrounds the opening in the skin layer and, through this opening, to at least a portion of the back face of the insert, which adhering layer extends over the back face of the insert and the back face of the skin layer to adhere the insert to the skin layer.

The adhering layer can be formed by an adhesive tape which is stuck to the back face of the insert and to the back face of the skin layer. Due to the limited thickness of the skin layer, the insert can be fixed strongly to the skin by the adhesive tape.

In a preferred embodiment, the adhering layer is however produced by applying a layer of a hardenable material, in particular a molten thermoplastic material or a curable composition, onto the back face of the insert and onto the back face of the surrounding skin layer and by allowing this layer of hardenable material to harden to produce the adhering layer.

Since the hardenable material is not applied in a closed cavity between the insert and the skin, as it is the case in WO 2010/003915, and since the skin layer covers the back face of the insert around the opening of the skin layer giving access to that back face, there is no risk that a portion of this hardenable material may penetrate along the sides of the insert towards the front face thereof. Moreover, since the insert is positioned in a recessed portion of the flexible skin layer, the insert can be dimensioned to fit exactly into that recessed portion to achieve a gap free connection between the front face of the skin and the visible side of the insert. Of course, the insert can also be dimensioned to achieve a predetermined gap between the front face of the skin and the insert. In the same way, penetration of hardenable material through that gap is avoided by the sealing contact between the back face of the insert and the portion of the skin layer which surrounds the opening in the skin layer and which engages the back face of the insert. As the adhesion between the insert and the skin is only visible on the back side of the skin, and not through any gap between the insert and the skin as is the case in WO 02/09977, there is a visually perfect integration of the insert in the skin at the visible side thereof.

In a preferred embodiment of the method of the present invention, the hardenable material used to produce the adhering layer is poured or sprayed onto the back face of the insert and onto the back face of the skin layer, the hardenable material being preferably a curable composition.

As with these methods, no pressure is exerted onto the hardenable material to apply it onto the back side of the insert so that it will not, or only to a minimum extent, penetrate between the portion of the skin layer that engages the back face of the insert around the opening in the skin layer, even when using a curable composition which has a relatively low viscosity, in particular in order to be sprayable.

In a further embodiment of the method of the present invention, the hardenable material used to produce the adhering layer is injected in a mould cavity against the back face of the insert and onto the back face of the skin layer, the hardenable material being in particular a curable composition which is injected in the mould cavity in accordance with a reaction injection moulding (RIM) process.

Although a pressure is exerted in this embodiment onto the hardenable material, it will again not, or only to a minimum extent, penetrate between the portion of the skin layer that engages the back face of the insert around the opening in the skin layer. Indeed, due to the fact that a portion of the skin layer engages the back face of the insert around the opening in the skin layer, any pressure exerted onto the hardenable material will press the skin layer against the back face of the insert and will thus improve the sealing contact between both.

In the method of the present invention, the mould surface onto which said skin layer is moulded, has a raised portion to produce a recessed portion in the front face of the flexible skin wherein the insert is fixed. The skin layer produced on the mould surface is further removed from this mould surface before positioning the insert in said recessed portion of the skin layer with said portion of its back face against said skin layer.

An advantage of this method is that the insert can be applied easily in the recessed portion of the skin layer. Moreover, it enables a quality control of the skin layer before adhering the insert(s) thereto so that inserts are not lost with scrap skins.

The raised portion of the mould surface onto which the skin layer is produced has preferably a lateral side showing at least one groove to form at least one lateral projection onto the skin layer, in particular a flexible lip, projecting into said recessed portion, the insert being positioned in this recessed portion in engagement with this lateral projection.

A first advantage of this embodiment is that the insert can easily be positioned correctly into the recessed portion of the skin. In case a gap has to be provided between the insert and the skin, the lateral projection onto the skin layer keeps the insert on the desired distance from the front face of the skin. A further advantage is that this projection forms a seal in the gap between the insert and the skin thus avoiding any penetration of curable composition between the insert and the skin and hiding from view any small amount of hardenable material which might have been penetrated between these two elements. Finally, it also reduces the visible depth of the gap between the insert and the skin.

In the method according to the present invention, a substrate layer is preferably applied on the back of said adhering layer, and an intermediate foam layer is preferably produced between said adhering layer and said substrate layer to fix the adhering layer to the substrate layer thus producing a self-supporting part, in particular a trim part for an automotive vehicle.

The present invention also relates to the flexible skin manufactured by the method of the present invention having one or more inserts adhered thereto, in particular in a recessed portion of the skin.

Other particularities and advantages of the invention will become apparent from the following description of some particular embodiments of the method and the flexible skin with inserts according to the present invention. The reference numerals used in this description relate to the annexed drawings wherein.

The invention generally relates to a method for manufacturing a flexible skin 1 having at least one insert 2 adhered thereto. The insert 2 is in particular a pre-manufactured insert which may consist of an aesthetic element (e.g. leather, textile, wood, . . . ), or a functional element (such as a switch, an electronic element, a lightening element, . . . ) or a combination thereof. The flexible skin 1, and the insert(s) adhered thereto, are in particular intended to form part of a trim part 3 for an automobile vehicle's interior, in particular interior trim parts such as dashboards, door panels, consoles, glove compartments, etc. As can be seen in FIG. 2G the trim part 3 comprises, in addition to the flexible skin 1 and the insert(s) 2, at least a substrate layer 4 or rigid carrier united to the back side of the skin 1, usually through the intermediary of an intermediate foam layer 5. The substrate layer 4 renders the trim part self-supporting.

The flexible skin 1 may be a thermoplastic skin or foil, in particular a TPE (thermoplastic elastomer) skin such as a TPO, PVC or an EV skin. Such thermoplastic skins can be moulded by a thermoforming process or for example by a slush moulding process. The flexible skin 1 can also be made starting from at least one curable composition, in particular at least one curable polyurethane composition. This curable composition is a flowable material which is applied onto a mould surface 6 and which is allowed to cure on that mould surface to produce the skin 1 or one of the layers of the skin 1.

The curable composition can either be applied by a spray process against the surface 6 of an open mould 7 or it can be applied in a closed mould, more particularly poured but preferably injected in accordance with a reaction injection moulding (RIM) process. Use can be made of a lightstable coloured PU reaction mixture. Reference can be made to EP-B-0 303 305, EP-B-0 379 246, WO 98/14492, EP-B-0 929 586 and WO 04/000905, which are included herein by reference.

In a variant embodiment, a finishing layer, in particular a light-stable paint or a so-called in-mould coating, either water or solvent-based, can be applied as a first coating layer against the mould surface. This paint composes together with the elastomeric layer or layers subsequently applied thereto, the flexible skin 1. The flexible skin 1 can also be made of two or more skin layers which are each produced from a curable composition, such as described in WO 2007/137623.

The flexible skin 1 is preferably an elastomeric skin. It has generally an elongation, measured in accordance with DIN/EN/ISO 527-3, of at least 30%, preferably of at least 50%. Its flexural modulus, measured in accordance with ASTM D790-03, is preferably smaller than 100 MPa, more preferably smaller than 75 MPa and most preferably lower than 55 MPa or even lower than 40 MPa. Generally, its overall density is larger than 300 kg/m$^3$, preferably larger than 500 kg/m$^3$ and more preferably larger than 600 kg/m$^3$.

In contrast to the flexible skin 1, the substrate layer 4 is relatively rigid and has in particular a flexural modulus, measured according to ASTM D790, higher than 500 MPa, preferably higher than 700 MPa. Although the substrate layer can be made of a thermosetting material, for example of a polyurethane material which is preferably reinforced with glass fibres or with a glass fibre mat, the substrate is preferably made of a thermoplastic material which may also be reinforced, in particular with glass fibres. This thermoplastic material is preferably selected from the group consisting of PC (polycarbonate), ABS (acrylonitrile butadiene styrene) and ABS blends, in particular PC/ABS, SMA (styrene maleic anhydride), PPO (polyphenylene oxide), TPO (thermoplastic olefin), in particular PP (polypropylene), polyacetals, in particular POMs (polyoxymethylenes), nylon, polyester, acrylic and polysulfone.

The substrate layer 4 can be formed in situ by a one step process, against the back the skin 1, in particular starting from a rigid PU system applied by an S-RIM (Structural RIM) or an R-RIM (Reinforced RIM) process in a closed mould or by a spray technique in an open mould as disclosed for example in European patent EP-B-0 642 411, or by a two step process against the back of the skin 1.

Figure 1:
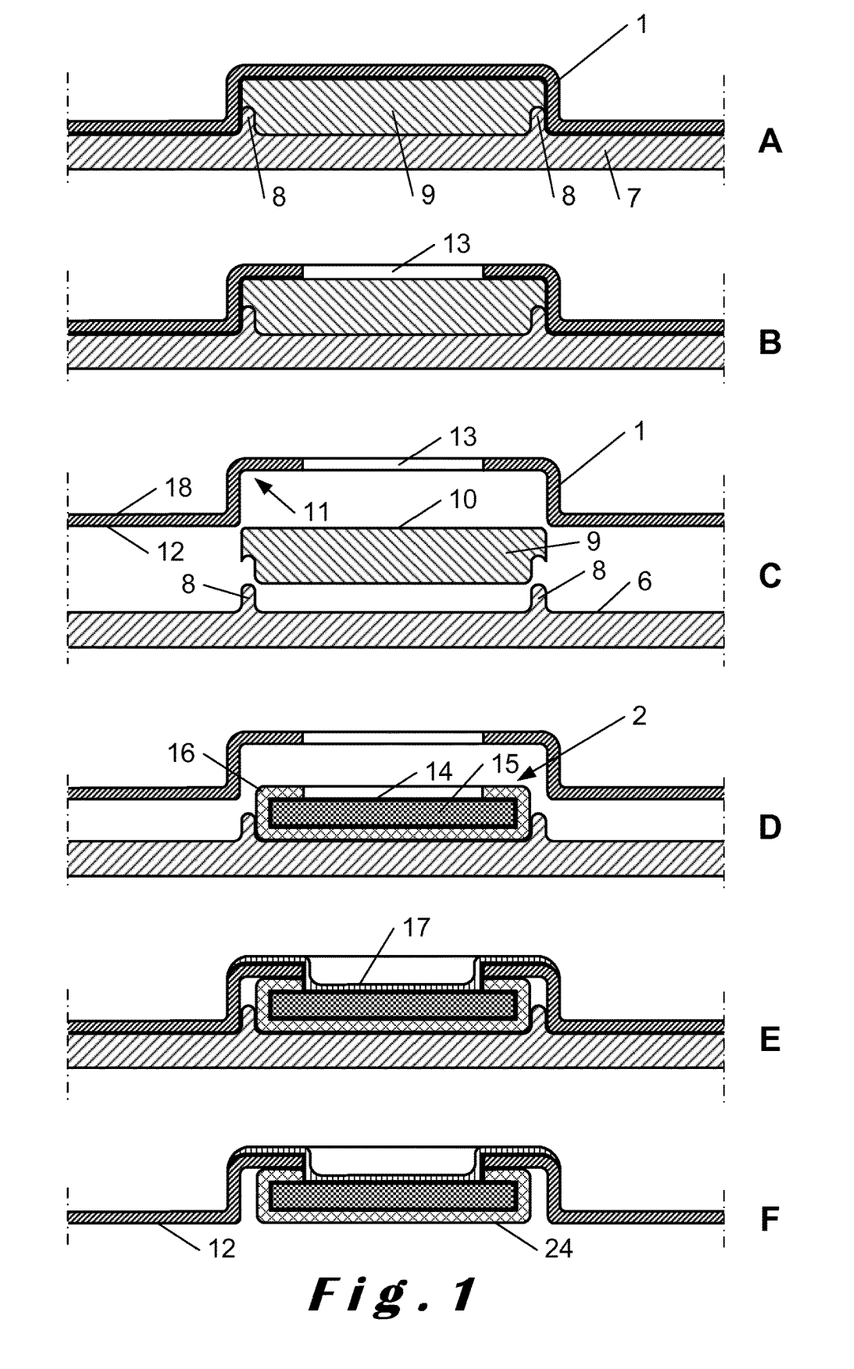
FIG. 1 illustrates schematically the steps of a method according to a first embodiment of the present invention.

A characterising feature of the method according to the invention is the way wherein the pre-manufactured insert or inserts 2 are integrated in the skin 1. A first embodiment of this method is illustrated in FIG. 1.

In a first step, illustrated in FIG. 1A, the flexible skin 1 is moulded against the surface 6 of a mould 7. The mould surface 6 shows upstanding edges 8 between which an additional mould surface element 9 is placed in order to provide a raised mould surface portion 10. In this way, a recessed portion 11 is produced in the front face 12 of the skin 1. The additional mould surface element 9 is preferably resilient so that it can be clamped with some pressure between the upstanding edges 8. It is preferably made of a silicone material. The skin can be produced for instance by spraying a curable polyurethane composition onto this mould surface 6 and onto the additional mould surface element 9 and by allowing it to cure thereon. To accelerate the curing process, this mould surface 6 is preferably heated, for example to a temperature of about 60° C. or higher.

In a second step, illustrated in FIG. 1B, an opening 13 is made in the skin 1, for example by die-cutting, which opening 13 gives access to the back face 14 of the insert 2. The opening 13 can be made in the skin 1 either when this skin is still positioned onto the mould surface or afterit has been removed therefrom.

In the next step, the additional mould surface element 9 is replaced by the insert 2 (see FIGS. 1C and D). This insert 2 is preferably also positioned between the upstanding edges 8. The insert 2 illustrated in FIG. 1D consists of a rigid core 15 covered with a textile covering 16.

After having checked the quality of the skin 1, it is repositioned onto the mould surface 6 whereby the insert 2 is positioned in the recessed portion 11 of the skin 1. As can be seen in FIG. 1D, a portion of the back face 14 of the insert 2 is brought in this step in engagement with the front face 12 of the skin 1, more particularly with that portion of the front face 12 of the skin 1 that surrounds the opening 13 in the skin 1. If that opening 13 was not yet applied in the skin 1, it can still be applied therein when the skin 1 is already positioned onto the back of the insert 2.

Figure 3:
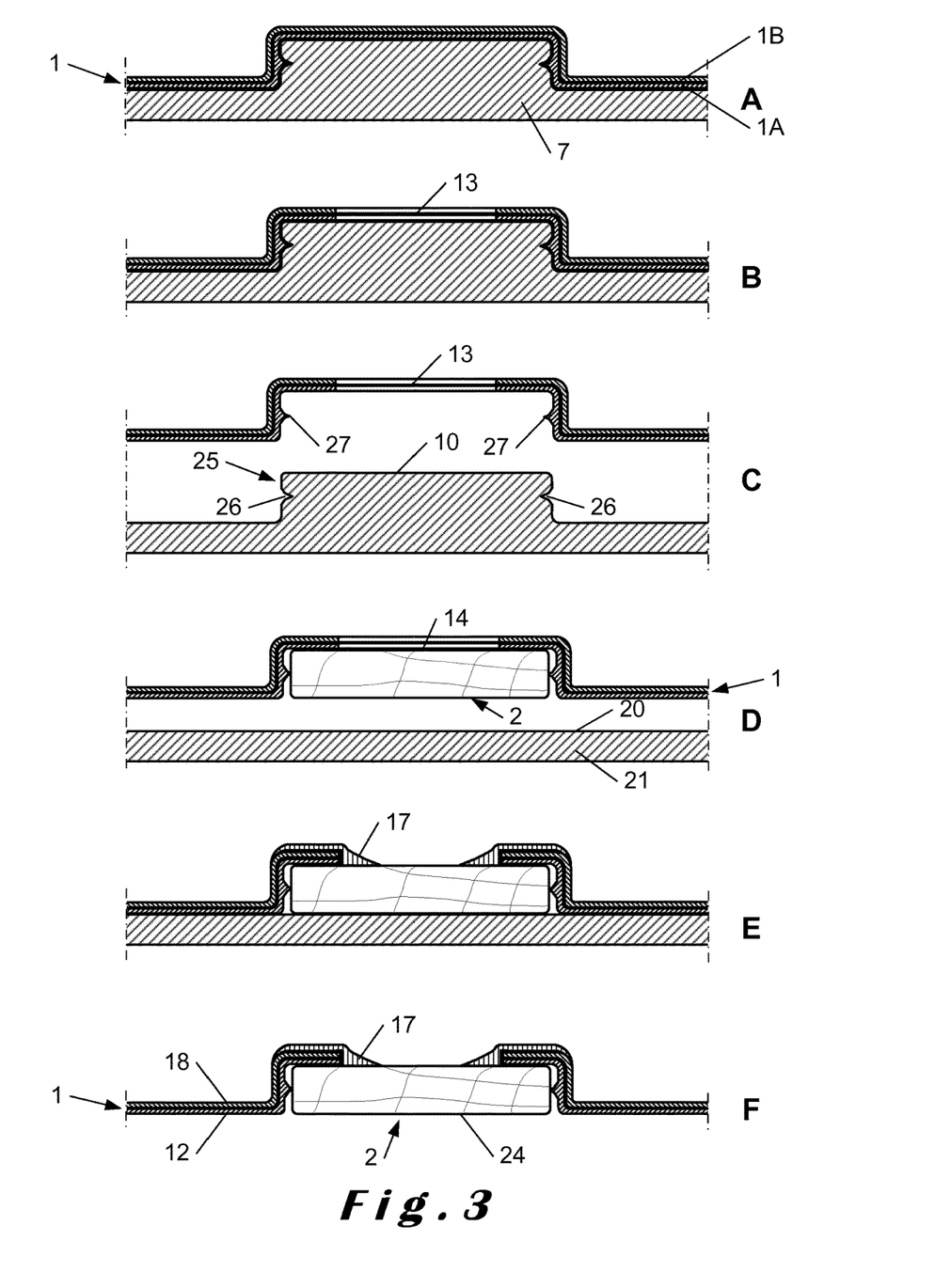
FIG. 3 illustrates schematically the steps of a second alternative method according to the present invention.

In the next step, illustrated in FIG. 1E, the back face 14 of the insert 2 is adhered by means of an adhering layer 17 to the skin 1. This adhering layer 17 can be applied by simply sticking an adhesive tape onto the back face 14 of the insert 2 and onto the back face of the skin. In a preferred embodiment, this adhering layer 17 is however produced by applying a hardenable material, on the one hand, through the opening 13 in the skin 1 onto at least a portion of the back face 14 of the insert 2 and, on the other hand, onto at least a portion of the back face 18 of the skin 1 that surrounds this opening 13. The hardenable material is applied in a layer that extends over the back face 14 of the insert 2 and the back face 18 of the skin 1 so that also the adhering layer 17, obtained after hardening the hardenable material, extends over the back face 14 of the insert 2 and the back face 18 of the skin 1 and covers the boundary between the skin 1 and the insert 2 to adhere the insert 2 to the skin 1. As can be seen in FIG. 3, the adhering layer 17 doesn't have to cover the entire back face 14 of the insert 2, nor the entire back face 18 of the skin 1. Indeed, the insert 2 can also be adhered to the skin 1 by means of an adhering layer 17 which only extends over the back face of the skin and the back face of the insert along the boundary between the insert and the skin and which covers this boundary. The opening 13 in the skin 1 is formed preferably by a hole in the skin so that the portion of the back face 14 of the insert 2 which is accessible through this hole is completely surrounded by the skin 1.

When the hardenable material is applied onto the back face 14 of the insert 2 and the back face 18 of the skin 1, the portion of the back face 14 of the insert 2 that is situated around the opening 13 in the skin 1 engages the front face 12 of the skin 1. The hardenable material is preferably sprayed or poured onto the back face of the insert and of the skin. In this way, the back face 14 of the insert 2 doesn't have to engage the front face 12 of the skin 1 all around the opening 13 since, due to the shielding effect of the skin 1, the hardenable material will not penetrate between the insert and the skin, or at most to a limited extent so that it will not be visible from the front side.

As illustrated in FIG. 4D, the hardenable material used to produce the adhering layer 17 could also be injected in a closed mould. In that case, the portion of the skin surrounding the opening 13 is preferably pressed over the entire periphery of the opening 13 onto the back face of the insert 2 either by means of a moulding tool 19 or by the pressure exerted by the hardenable material onto this skin portion.

The hardenable material may be a thermoplastic material that is applied in a molten state onto the back of the insert and the back of the skin. It may be in particular a hot melt glue.

The hardenable material may also be a curable composition as described hereabove for the skin 1, more preferably a curable polyurethane composition. It can be formulated to produce a substantially non-cellular or microcellular adhering layer, or alternatively, a blowing agent can be added in order to produce a foamed adhering layer, which can function as a backfoam layer. Moreover, the hardenable material can also produce, after hardening, in particular after curing, a more rigid material, which can function as the rigid substrate. Consequently, also the hardenable materials, in particular the curable compositions which are described hereabove for the substrate layer 4, can be used to produce the adhering layer 17.

The adhering layer 17 may thus have an average density higher than 300 kg/m³, preferably higher than 400 kg/m³ and more preferably higher than 500 kg/m³. The density of the adhering layer 17 can however also be reduced to lower densities, in particular to a density lower than 300 kg/m³, more particularly to a density lower than 200 kg/m³.

Figure 2:
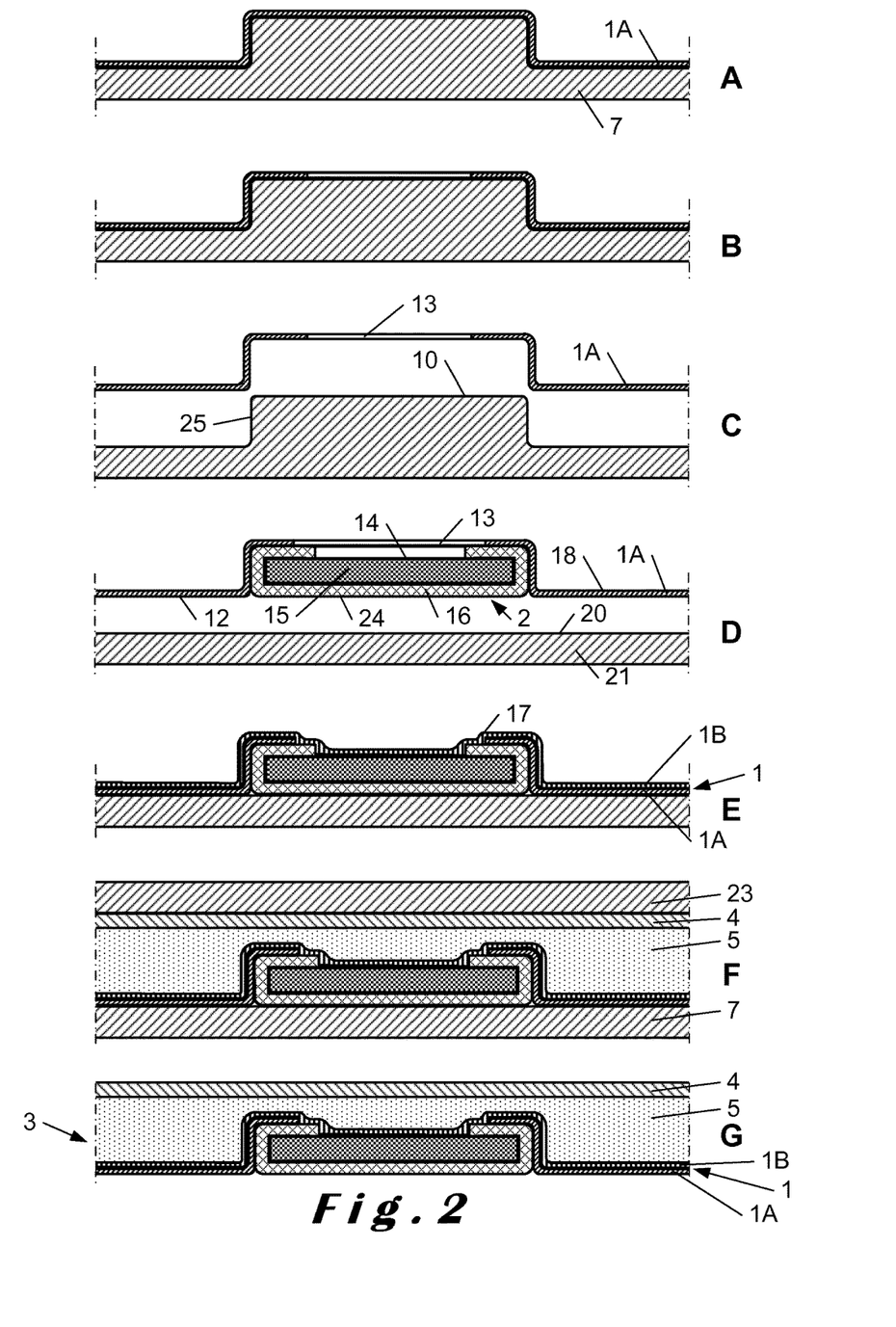
FIG. 2 illustrates schematically the steps of a first alternative method according to the present invention.

A second example of a method of the present invention is illustrated in FIG. 2. In this example the skin 1 consists of two skin layers, the first skin layer 1A being produced by applying a first curable polyurethane composition onto the mould surface and the second skin layer 1B being produced by applying a second curable polyurethane composition onto the back of the first skin layer 1A. The first curable polyurethane composition is preferably an aliphatic polyurethane composition whereas the second curable polyurethane composition is preferably an aromatic polyurethane composition. As mentioned already hereabove, suitable curable polyurethane compositions for producing such a composite skin 1 are described in WO 2007/137623.

In a first step, illustrated in FIG. 2A, the first skin layer 1A is sprayed onto the mould surface 6. In this embodiment, the raised portion 10 of the mould surface 6 is formed by the mould 7 itself and not by an additional mould surface element as in FIG. 1. After having removed the first skin layer 1A from the mould surface 6, the insert 2 is positioned therein, more particularly in the recessed portion 11 in the front face of this first skin layer 1A, and the first skin layer 1A is positioned with the insert 2 contained therein onto the surface 20 of a further mould 21. As can be seen in FIGS. 2D and E, this further mould surface 20 corresponds to the first mould surface apart from the fact that the raised surface portion 10 of the mould has been omitted so that the skin layer 1A, the recessed portion 11 of which is filled with the insert 2, can be positioned onto this further mould surface 20.

In the next step, illustrated in FIG. 2E, the curable composition for producing the adhering layer 17 is sprayed onto the back face of the first skin layer 1A and onto the back face of the insert 2. This adhering layer 17 covers the entire back face of the first skin layer 1A substantially completely to form the second skin layer 1B. In this case the curable composition for producing the adhering layer 17 is thus comprised of the second curable polyurethane composition from which the second skin layer 1B is produced. The adhering layer 17 is thus formed by the second skin layer 1B.

The curable composition forming the adhering layer can additionially contain a blowing agent in order to reduce the density of the adhering layer and thus also the second skin layer. Such foamed second skin layer is also disclosed in WO 2007/137623. The blowing agent can be added in such an amount that the adhering layer functions as a backfoam layer.

As explained hereabove, the second curable polyurethane composition is preferably an aromatic polyurethane composition which is more reactive than the aliphatic polyurethane composition of the first skin layer 1A. Due to the higher reactivity of the second curable polyurethane composition, the maximum temperature of the further mould surface 20 (i.e. the maximum temperature reached by the further mould surface 20) may be lower than the maximum temperature of the mould surface 6 onto which the first skin layer 1A is produced (i.e. the maximum temperature reached by this mould surface 6). An important advantage hereof is that more temperature sensitive inserts 2 can be adhered to the skin 1 since the inserts 2 are positioned only onto the further mould surface 20. Moreover, the transitions between the skin 1 and the inserts 2 are not affected by possible differences in thermal expansion between the inserts and the skin.

FIGS. 2F and G illustrate a possible way of making a self-supporting trim part 3 from the flexible skin 1. The substrate layer 4 of such a part is attached to an upper mould part 23, a foamable reaction mixture is poured onto the back of the skin 1 before closing the mould 21, 23, or is injected between the back of the skin 2 and the substrate layer 4 after having closed the mould 21, 23, and this foamable reaction mixture is allowed to foam and cure in the closed mould 21, 23 to produce the intermediate foam layer 5 uniting the substrate layer 4 to the back of the skin 1.

In the method illustrated in FIG. 2, the insert 2 was positioned in the recessed portion 11 of the skin layer 1B so that the lateral sides of the insert 2 engage the lateral sides of the recessed portion 11 of the skin 1. In other words, the method according to the invention enable to achieve a gap free transition between the front face 12 of the skin 1 and the front face 24 of the insert 2.

FIG. 3 illustrates an example of a method enabling to provide a gap of a controlled width (small or large) between the front face 24 of the insert 2 (now formed by a piece of wood or of another rigid material) and the front face 12 of the skin 1. In this method, the raised portion 10 of the mould surface 6 onto which the first skin layer 1B is produced has a lateral side 25 which shows a groove 26. In this way, a lateral projection 27, in particular a flexible lip, is formed onto the lateral sides of the recessed portion 11 of the skin 1. This projection 27 projects over such a distance into the recessed portion 11 of the skin 1 so that the insert 2 is positioned in this recessed portion 11 in engagement with this lateral projection 27. In this way, the insert 2 is automatically correctly positioned in the recessed portion 11 of the skin 1.

A further difference with the method illustrated in FIG. 2 is that in the method illustrated in FIG. 3 the second curable polyurethane composition for producing the second skin layer 1B is applied onto the back of the first skin layer 1A immediately after this first skin layer 1A has been produced on the mould surface 6. The opening 13 is subsequently made through both skin layers 1A and B. As illustrated in FIG. 3E a separate curable composition is then applied onto the back face of the skin 1 and of the insert 2 to produce the adhering layer 17 in a same way as illustrated in FIG. 1E.

Figure 4:
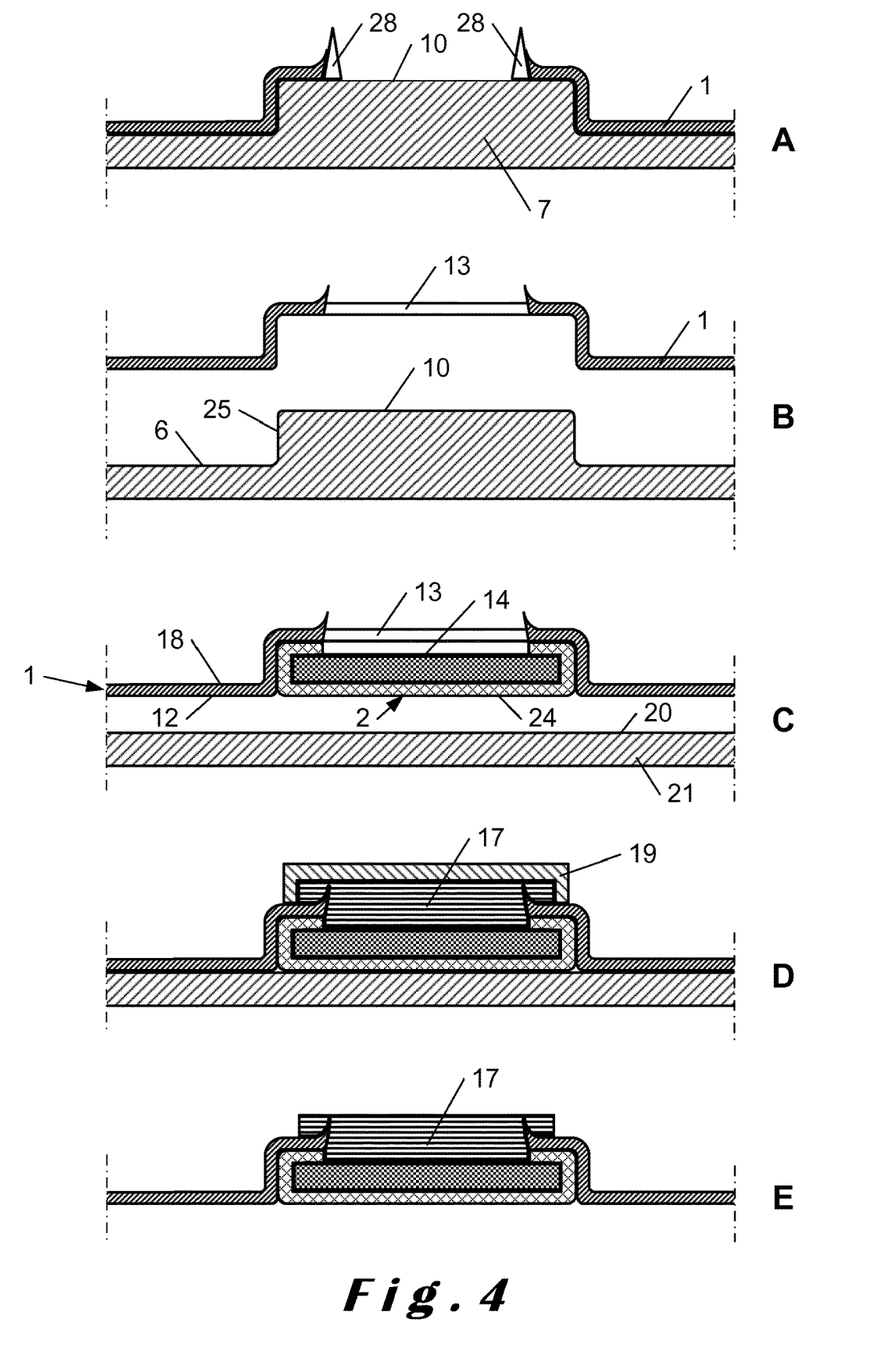
FIG. 4 illustrates schematically the steps of a third alternative method according to the present invention.

FIG. 4 illustrates a method wherein there is no need to cut the opening 13 in the skin 1. This is achieved by providing cutting edges 28 on the raised portion 10 of the mould surface 6. Such cutting edges 28 are upstanding edges having a sharp top so that the curable composition sprayed onto this top runs completely off or has only a very small thickness so that any overspray can be torn off easily. For further details about such a method reference is made to WO 2007/023157.

In FIG. 4D a method is illustrated wherein the adhering layer 17 is made by a RIM (Reaction Injection Moulding) process instead of by a spray or pouring method. An upper moulding tool 19 is used for this process. This tool 19 is preferably positioned onto the back face 18 of the skin 1 to form a closed mould cavity behind the insert 2 and the portion of the skin 1 surrounding the opening 13 in the skin 1 giving access to the back face 14 of the insert 2. The curable composition for producing the adhering layer 17 is injected in this closed mould cavity.

The adhering layer 17 can be produced in a smaller mould part which supports the skin only at the location of the insert. The insert 2 can then be hold with its back face 14 substantially horizontally so that the curable composition for producing the adhering layer 17 can be applied more easily (without of with less run-off) onto the back of the insert and the skin.

With the RIM process illustrated in FIG. 4D the adhering layer 17 can also be produced over the entire back face 18 of the skin 1. This is done with a RIM mould 23 as illustrated in FIG. 2F. When the adhering layer 17 is a flexible foam layer, it thus forms a backfoam layer providing for a soft touch. Alternatively, the adhering layer 17 could also be a rigid layer which renders the part self-supporting and which thus forms a substrate layer 4.

The invention claimed is:

1. A method for manufacturing a flexible skin which has at least one insert adhered thereto,
   said flexible skin and said insert defining together a visible front surface;
   said flexible skin consisting of one or more skin layers and having a front face, forming a first portion of the visible front surface of the skin, and a back face; and
   said insert having a back face, which is fixed by means of an adhering layer to this flexible skin, and a front face, which forms a second portion of said visible front surface, which second portion is situated adjacent to said first portion of the visible front surface,
   said method comprising the successive steps of:
   providing a mould surface;
   moulding at least one of said one or more skin layers against said mould surface to obtain at least one moulded skin layer, which mould surface has a raised portion so that a recessed portion is produced in the front face of said at least one moulded skin layer;
   removing said at least one moulded skin layer from the mould surface;
   positioning said insert in said recessed portion with a portion of its back face against said at least one moulded skin layer; and
   adhering the back face of the insert by means of an adhering layer to said at least one moulded skin layer, wherein
   said at least one moulded skin layer is provided with at least one opening giving access to the back face of the insert; and
   after having positioned the insert with a portion of its back face against the front face of said at least one moulded skin layer, the back face of the insert is adhered to said at least one moulded skin layer by providing said adhering layer which is adhesively connected to at least a portion of the back face of said at least one moulded skin layer which surrounds the opening in said at least one moulded skin layer and, through this opening, to at least a portion of the back face of the insert, which adhering layer extends over the back face of the insert and the back face of said at least one moulded skin layer and covers a boundary between the back face of the insert and the back face of said at least one moulded skin layer to adhere the insert to said at least one moulded skin layer, said adhering layer being produced by applying a layer of a hardenable material onto the back face of the insert and onto the back face of said at least one moulded skin layer and by allowing this layer of hardenable material to harden;
   said hardenable material being either poured or sprayed onto the back face of the insert, onto the back face of said at least one moulded skin layer and onto the boundary between the back face of the insert and the back face of said at least one moulded skin layer and is allowed to harden in an open mould; or
   said hardenable material is injected in a mould cavity against the back face of the insert and onto the back face of said at least one moulded skin layer, the mould cavity being formed by a moulding tool by means of which a portion of said at least one moulded skin layer which surrounds said opening is pressed against the back face of the insert.

2. A method according to claim 1, wherein said hardenable material is a molten thermoplastic material or a curable composition.

3. A method according to claim 2, wherein said hardenable material is a curable polyurethane composition.

4. A method according to claim 1, wherein the front face of said at least one moulded skin layer and the front face of the insert are supported on a further mould surface when the back face of the insert is adhered to said at least one moulded skin layer, the insert being either positioned first onto this further mould surface before positioning said at least one moulded skin layer onto this mould surface thereby positioning the insert into said recessed portion of said at least one moulded skin layer or the insert is positioned into the recessed portion of said at least one moulded skin layer before said at least one moulded skin layer is positioned onto said further mould surface.

5. A method according to claim 1, wherein the front face of said at least one moulded skin layer and the front face of the insert are supported on said mould surface when the back face of the insert is adhered to said at least one moulded skin layer, the recessed portion in the front face of said at least one moulded skin layer being provided by locally raising a portion of the mould surface, and, after said at least one moulded skin layer is moulded on the mould surface, this said at least one moulded skin layer is removed therefrom and repositioned with the insert onto said mould surface, with said portion of the mould surface being lowered to support the insert in the recessed portion of said at least one moulded skin layer.

6. A method according to claim 5, wherein said portion of the mould surface is raised by positioning an additional mould surface element onto the mould surface between upstanding edges on the mould surface.

7. A method according to claim 1, wherein said raised portion of the mould surface has a lateral side showing at least one groove to form at least one lateral projection formed by a flexible lip onto said at least one moulded skin layer projecting into said recessed portion, the insert being positioned in this recessed portion in engagement with this lateral projection.

8. A method according to the claim 1, wherein said one or more skin layers comprise a first elastomeric polyurethane skin layer and said first elastomeric polyurethane skin layer is moulded by applying a first curable polyurethane composition onto said mould surface and by allowing this first curable polyurethane composition to cure to produce a said first elastomeric polyurethane skin layer before removing said first elastomeric polyurethane skin layer from the mould surface.

9. A method according to claim 8, wherein said one or more skin layers comprise a second elastomeric polyurethane skin layer which is moulded by applying a second curable polyurethane composition on the back of said first elastomeric skin layer, and by allowing this second curable polyurethane composition to cure to produce a second elastomeric polyurethane skin layer.

10. A method according to claim 9, wherein said second curable polyurethane composition is also applied onto said portion of the back face of the insert to produce, after curing, said adhering layer.

11. A method according to claim 1, wherein after having adhered the back face of the insert to said at least one moulded skin layer, a substrate layer is united to the back of said adhering layer and to the back of the skin consisting of said one or more skin layers to produce a self-supporting part.

* * * * *